(12) United States Patent
St. John

(10) Patent No.: US 11,375,854 B2
(45) Date of Patent: Jul. 5, 2022

(54) PORTABLE SUPPORT FOR FOOD CUTTER, SYSTEMS AND METHODS

(71) Applicant: Joel A St. John, Houston, TX (US)

(72) Inventor: Joel A St. John, Houston, TX (US)

(73) Assignee: Joel A. St. John, Houston, TX (US)

( * ) Notice: Subject to any disclaimer, the term of this patent is extended or adjusted under 35 U.S.C. 154(b) by 687 days.

(21) Appl. No.: 16/413,213

(22) Filed: May 15, 2019

(65) Prior Publication Data

US 2020/0359846 A1 Nov. 19, 2020

(51) Int. Cl.
*A47J 47/00* (2006.01)
*B26B 1/02* (2006.01)
*B26B 29/06* (2006.01)

(52) U.S. Cl.
CPC .............. *A47J 47/005* (2013.01); *B26B 1/02* (2013.01); *B26B 29/063* (2013.01)

(58) Field of Classification Search
CPC ............................ B26B 29/063; A47J 47/005
USPC ........ 30/114, 312; 269/289 R, 290, 292, 298
See application file for complete search history.

(56) References Cited

U.S. PATENT DOCUMENTS

| | | | | |
|---|---|---|---|---|
| 717,223 A * | 12/1902 | Leachma | ................ | B26D 3/00 83/468.1 |
| 1,032,632 A | 7/1912 | Springer | | |
| 1,094,604 A | 4/1914 | Shibata | | |
| 1,496,917 A | 6/1924 | Baerenfaenger | | |
| 2,131,092 A | 9/1938 | Bloomfield | | |
| 2,179,050 A | 11/1939 | Montague | | |
| 2,207,754 A * | 7/1940 | Neary | .................. | B26B 29/063 83/468.6 |
| 3,869,951 A * | 3/1975 | Litwin | ................. | B23Q 9/0014 83/485 |
| 4,109,901 A * | 8/1978 | Akin | ..................... | B23Q 9/0092 83/522.18 |
| 4,383,365 A * | 5/1983 | Metzigian | ................ | B26D 7/00 30/304 |
| 4,453,438 A * | 6/1984 | Zelli | ..................... | B23Q 9/0042 30/372 |
| 4,712,462 A * | 12/1987 | Cvek | .................... | B23Q 16/001 83/762 |
| 5,121,679 A | 6/1992 | Mertz | | |
| 6,176,281 B1 * | 1/2001 | Newman | .............. | B23Q 9/0042 144/144.1 |
| 7,240,596 B1 * | 7/2007 | Campbell | .............. | B23D 47/02 83/745 |
| 2004/0207140 A1 * | 10/2004 | Johnson | ................ | A47J 47/005 269/289 R |
| 2011/0221111 A1 * | 9/2011 | Stigall | ................... | A47J 47/005 269/289 R |
| 2020/0359846 A1 * | 11/2020 | St. John | .................... | B26B 1/02 |

* cited by examiner

*Primary Examiner* — Hwei-Siu C Payer

(74) *Attorney, Agent, or Firm* — Matthews, Lawson, McCutcheon & Joseph, PLLC

(57) ABSTRACT

A system for cutting food includes a food cutter including feet for mounting the food cutter, a can opener holder comprising a cavity, and a portable support for the food cutter. The portable support includes a substantially planar frame extending in a plane, an attachment device on the frame that connects the feet of the food cutter to the frame, and a shaft protruding from the frame and extending substantially parallel with the plane of the frame. The portable support is releasably attached to the food cutter when the feet are connected to the attachment device, and at least a portion of the shaft is located in the cavity of the can opener holder.

17 Claims, 10 Drawing Sheets

PORTABLE SUPPORT FOR FOOD CUTTER, SYSTEMS AND METHODS

BACKGROUND

1. Field of the Invention

The present disclosure relates to a portable support for a manual food cutter, such as a potato cutter. The present disclosure also relates to a system for cutting food, such as potatoes, and further relates to a method for cutting food. In particular, the present disclosure relates to a portable support, system and method for cutting food, such as potatoes, in a relatively small preparation area where counter space is at a premium, such as in a food truck, bar or restaurant kitchen.

2. Description of Related Art

Potato cutters are known, and are typically used to cut potatoes into strips to make french-fries. Potato cutters have also been used to cut other types of food, such as fruits and vegetables. For instance, carrots, tomatoes, onions, apples, among other fruits and vegetables, may each be inserted into a potato cutter, and cut into strips. Known potato cutters suffer from several problems. In particular, known potato cutters are bolted or otherwise fixed on a counter, table or wall, thus taking up valuable counter, table or wall space. In addition, the known potato cutters suffer from sanitary problems because they are difficult to clean while anchored to the counter, table or wall. Moreover, it can be time consuming to unbolt the potato cutter from the counter, table or wall to thoroughly clean the potato cutter, such as to wash the potato cutter in a sink or commercial dishwashing machine.

The portable support, systems and methods for cutting food, such as potatoes, discussed herein overcome the above problems. While the present disclosure discusses a portable support for a potato cutter, the potato cutter is just one example of a food cutter that may be used with the portable support according to the invention. The present disclosure is not meant to be limited to only potato cutters, or to potato cutters that are only capable of cutting potatoes.

SUMMARY

A need exists for a food cutting system that saves valuable counter space (or table or wall space), is easy to clean, and is quickly and easily anchored to and removed from a counter (or table or wall) or other use position.

The present disclosure meets these needs and, in one embodiment, is directed to a portable support for a food cutter, comprising: a substantially planar frame extending in a plane; an attachment device on the frame for attaching the frame to the food cutter; a shaft protruding from the frame and extending substantially parallel with the plane of the frame, wherein the shaft comprises a dimension configured to be inserted into a holder of a can opener that is fixed to a table or counter to orient the frame substantially vertically relative to the table or counter.

The portable support imparts an increased level of sanitation to the food cutter because the frame—with the attached cutter—can be withdrawn from the holder of the can opener as a unit, and the unit can easily be washed in a sink or commercial dishwashing machine. Because the portable support is portable and acts as a wall for the food cutter, the portable support is particularly useful in smaller kitchens or food trucks where counter space (or table or wall space) is at a premium. Moreover, the shaft of the portable support allows the food cutter to be easily mounted and dismounted from the holder of the can opener, which saves preparation time.

In an embodiment, the attachment device comprises a channel on opposite sides of the frame. In another embodiment, the attachment device comprises a plurality of holes in the frame.

In an embodiment, the shaft is provided with one of a detachable sleeve and a spacer to increase the dimension of the shaft.

In an embodiment, the frame is substantially rectangular, and each of the plurality of holes is respectively located in a vicinity of a corner of the frame.

In an embodiment, the shaft extends from one end of the frame to an opposite end of the frame.

In another embodiment, a system for cutting foods comprises: a food cutter including feet for mounting the food cutter; a can opener holder comprising a cavity; and a portable support for the food cutter. The portable support comprises: a substantially planar frame extending in a plane; an attachment device on the frame that connects the feet of the food cutter to the frame; and a shaft protruding from the frame and extending substantially parallel with the plane of the frame, wherein the portable support is releasably attached to the food cutter when the feet are connected to the attachment device, and at least a portion of the shaft is located in the cavity of the can opener holder.

In an embodiment, the shaft is releasable from the cavity of the can opener holder while the food cutter is attached to the portable support.

In an embodiment, the shaft is provided with one of a detachable sleeve and a spacer to increase the dimension of the shaft.

In an embodiment, the can opener holder is fixed to a table or counter, and orients the frame substantially vertically relative to the table or counter when the at least a portion of the shaft is located in the cavity of the can opener holder.

In an embodiment, the attachment device comprises a channel on opposite sides of the frame, and the feet are configured to be inserted into the channels for connecting the feet to the frame. In another embodiment, the attachment device comprises a plurality of holes in the frame, and each of the feet comprises a hole for aligning with one of the plurality of holes in the frame for connecting the feet to the frame with a bolt through an aligned pair of holes.

In an embodiment, the frame is substantially rectangular, the attachment device comprises a plurality of holes, and each of the plurality of holes is respectively located in a vicinity of a corner of the frame.

In an embodiment, the shaft extends from one end of the frame to an opposite end of the frame.

In a further embodiment, a method for cutting food comprises attaching a food cutter to a portable support via an attachment device, the portable support comprising a substantially planar frame extending in a plane; and a shaft protruding from the frame and extending substantially parallel with the plane of the frame; and inserting at least a portion of the shaft into a cavity of a can opener holder that is fixed to a surface to orient the frame substantially vertically relative to the surface.

In an embodiment, the method further comprises providing the shaft with one of a detachable sleeve and a spacer to increase the dimension of the shaft.

In an embodiment, the method further comprises withdrawing the shaft from the cavity of the can opener holder while the food cutter is attached to the portable support.

In an embodiment, the shaft extends from one end of the frame to an opposite end of the frame.

BRIEF DESCRIPTION OF THE DRAWINGS

Various embodiments are hereafter described in detail and with reference to the drawings wherein like reference characters designate like or similar elements throughout the several figures and views that collectively comprise the drawings.

DETAILED DESCRIPTION

Before explaining the disclosed embodiments in detail, it is to be understood that the present disclosure is not limited to the particular embodiments depicted or described, and that the invention can be practiced or carried out in various ways. The disclosure and description herein are illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. Further, the relative size and arrangement of the components may differ from that shown and still operate within the spirit of the invention.

Moreover, as used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments discussed herein. However, depending on the orientation of the portable support discussed herein, such terms may refer to a left to right, right to left, or other relationship as appropriate. Because many varying and different embodiments may be made within the scope of the concept(s) herein taught, and because many modifications may be made in the embodiments described herein, it is to be understood that the details herein are to be interpreted as illustrative and non-limiting.

Figure 1:
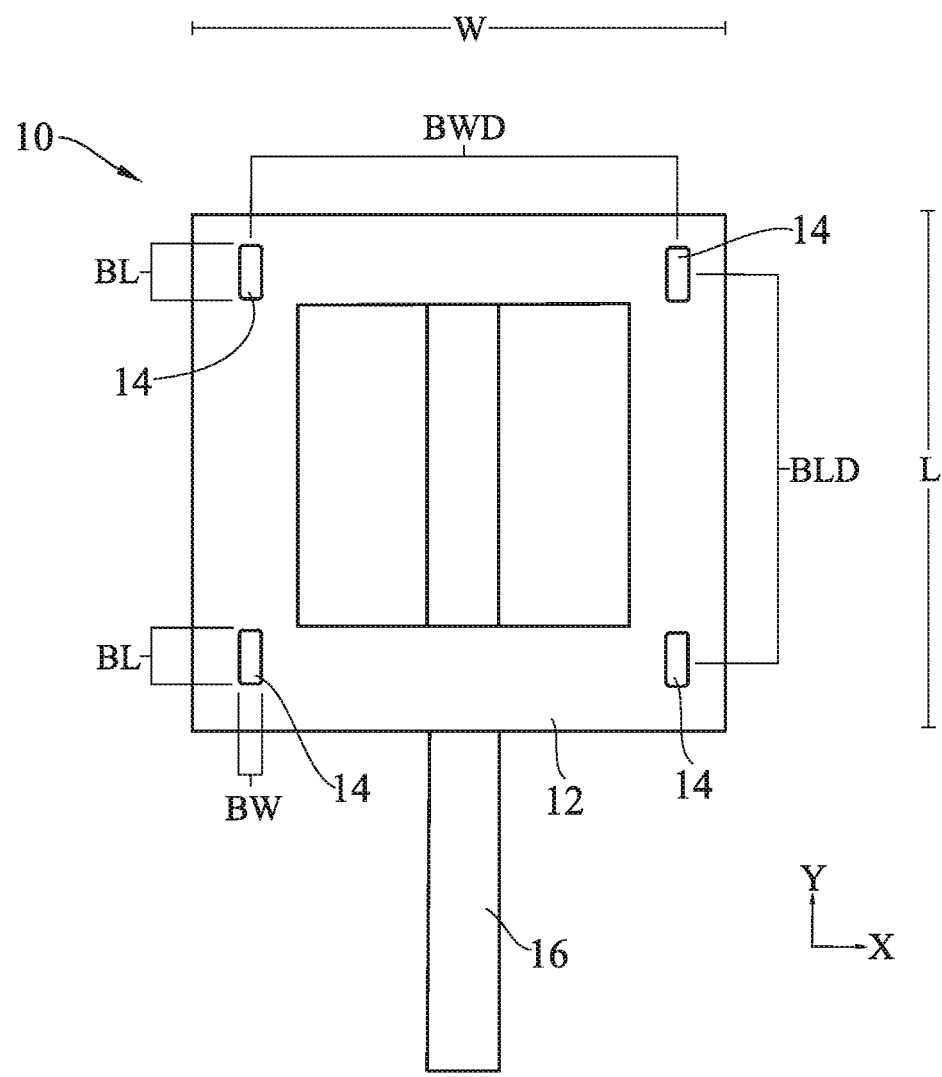
FIG. 1 is a front view of the portable support for a potato cutter according to an embodiment.

FIG. 1 shows a preferred embodiment of the portable support 10 for a food cutter, such as a potato cutter 20 (see FIG. 4), and is a front view of the portable support 10. The portable support 10 is formed of a substantially planar frame 12 that extends in a plane "x", "y". "Substantially" planar as used herein means that the frame 12 is generally plate-shaped, having a dimension in the "x", "y" plane that is greater than a thickness of the frame 12 in a direction perpendicular to the "x", "y" plane. In addition, "substantially" planar means that the frame 12 may or may not be perfectly planar, such that variations in the thickness of the frame 12 along the plane "x", "y", and slight variations of the frame 12 from the plane "x", "y", are encompassed within the scope of this disclosure. In a preferred embodiment, the frame 12 may be formed of stainless steel. In alternative embodiments, the frame 12 may be formed of a composite plastic material, cast iron, or any National Sanitary Foundation (NSF) certified material.

In an exemplary embodiment, the frame 12 may be 22.86 cm (9 inches) wide (see "W" dimension in FIG. 1), 30.48 cm (12 inches) high (see "L" dimension in FIG. 1), and may have a thickness "T" that ranges from 0.48 cm (3/16 of an inch) to 2.54 cm (1 inch). However, these dimensions are not limiting, and other dimensions may be selected depending on the type, make and model of the potato cutter 20 (see FIG. 4) to be mounted to the frame 12. The frame 12 has a generally rectangular shape as shown in FIG. 1. However, the shape of the frame 12 may be square, or some other polygonal shape, so long as the frame 12 has a shape to accommodate a number of bolt holes 14 sufficient for mounting the potato cutter 20 to the frame 12. In the illustrated embodiment, the number of bolt holes is four, with each bolt hole 14 in a respective corner, or vicinity of a respective corner, of the rectangular shape of the frame 12. The bolt holes 14 are configured to align with corresponding bolt holes 22 of the potato cutter 20 (see FIG. 4), so that a bolt (not shown) passing through an aligned pair of bolt holes 14, 22 serves to releasably fix the potato cutter 20 to the frame 12 with a nut. A distance "BLD" between the centers of adjacent holes 14 on sides of the frame may be 27 cm (10 and 5/8 inches). A distance "BWD" between the centers of adjacent holes 14 on the top of the frame may be 18.42 cm (7 and 1/4 inches). Similarly a distance between the centers of adjacent holes 14 on the bottom of the frame may be 18.42 cm (7 and 1/4 inches). However, these dimensions are not limiting, and other dimensions may be selected depending on the type, make and model of the potato cutter 20 (see FIG. 4) to be mounted to the frame 12.

In a preferred embodiment, the location of the plurality of bolt holes 14 on the frame 12 is on the corners of the frame 12 so that the bolt holes 14 are able to align with the corresponding bolt holes 22 of the potato cutter 20. In this regard, the shape of each of the bolt holes 14 may be elongated, as opposed to circular, so as to accommodate slight variations in the location of the corresponding bolt holes 22 of the potato cutter 20. The elongated shape of the bolt holes 14 may thus accommodate different bolt hole layouts of the potato cutter 20. In an embodiment, the length "BL" of the elongated bolt holes 14 may be 1.27 cm (1/2 inch), and the width "BW" may be 0.48 cm (3/16 of an inch).

The elongated bolt holes 14 may extend in the "y" direction as shown in FIG. 1, or may extend in the "x" direction. Alternatively, the elongated bolt holes 14 may extend in a vector that is a combination of the "x" and "y" directions (e.g., diagonally on the frame 12). Still further, each of the bolt holes 14 may be "L" shaped, having one portion of the shape extending in the "x" direction, and the other portion extending in the "y" direction. In a further embodiment, each of the bolt holes 14 may have a crescent shape. Alternatively, the each of the bolt holes 14 may have an "X" shape, a "T" shape, a "+" shape, or a keyhole shape (e.g., a combination of a circle and a rectangle). The goal of the different shapes for the bolt holes 14 is to be able to accommodate several different layouts of the potato cutter bolt holes 22, in order to be able to mount different types of potato cutters to the same frame 12.

The portable support 10 further includes a shaft 16 protruding from the frame 12 and extending substantially parallel with the plane "x", "y" of the frame 12. In a preferred embodiment, the shaft 16 extends from one end of the frame 12 to an opposite end of the frame 12, so as to provide more stability for the frame 12 when the portable support 10 is mounted to the can opener holder 32 (discussed below). In an alternative embodiment however, the shaft 16 may extend only from the base of the frame 12. In either embodiment, the shaft 16 protrudes about 12.7 cm (5 inches) from the base of the frame 12, as shown in FIG. 1. The shaft 16 may be tubular shaped, with a rectangular or square cross-section. In a preferred embodiment, the cross-sectional dimensions of the shaft 16 may be 1.27 cm by 1.27 cm (½ inch by ½ inch). In other embodiments, the cross-sectional dimensions of the shaft 16 may be 1.91 cm by 1.91 cm (¾ inch by ¾ inch), or may be 3.175 cm by 3.175 cm (1 and ¼ inches by 1 and ¼ inches). That is, the cross-sectional dimensions of the shaft 16 may range from 1.27 cm by 1.27 cm (½ inch by ½ inch) to 3.175 cm by 3.175 cm (1 and ¼ inches by 1 and ¼ inches), and be other values within that range. The shaft may be formed of the same material as the frame 12, or may be formed of a different material. Materials for the shaft 16 include stainless steel, composite plastic material, cast iron, or any National Sanitary Foundation (NSF) certified material. In an embodiment, the shaft 16 may be welded to the frame 12. In an alternative embodiment, the shaft 16 is formed as one integral piece with the frame 12.

Figure 2:
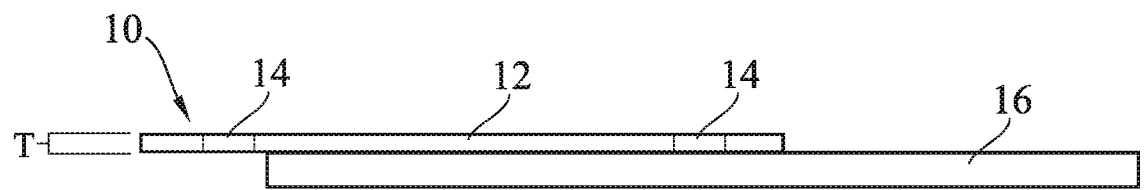
FIG. 2 is a side view of the portable support for a potato cutter according to an embodiment.
Figure 3A:
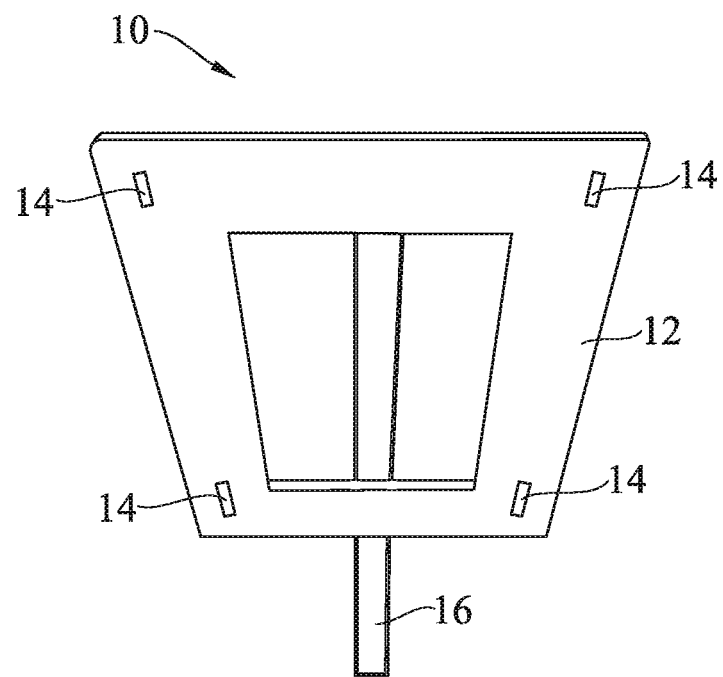
FIGS. 3A and 3B are perspective views of the portable support for a potato cutter according to an embodiment.
Figure 3B:
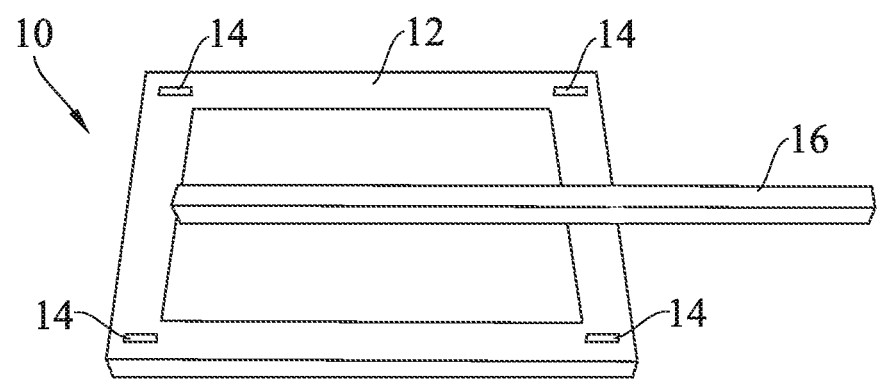

FIG. 2 illustrates a side view of the portable support 10 of FIG. 1. FIG. 3A is a perspective top view of the portable support 10 of FIG. 1. FIG. 3B is a perspective rear view of the portable support 10 of FIG. 1.

Figure 3C:
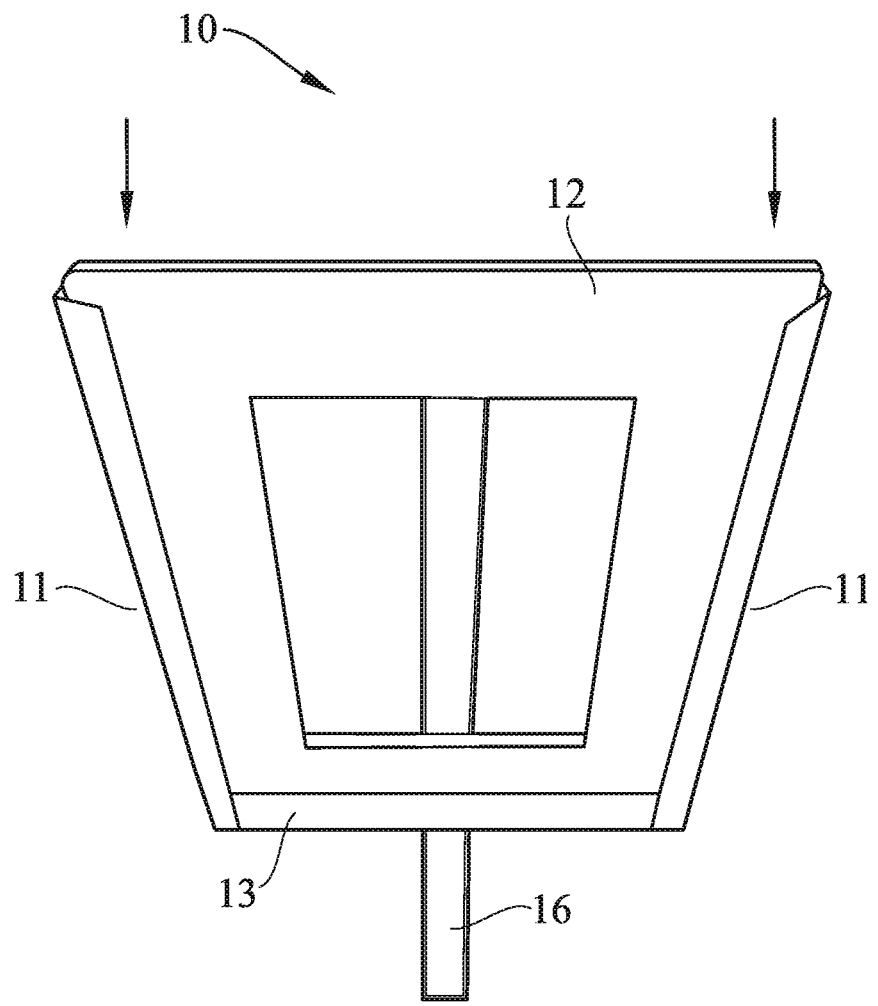
FIG. 3C is a perspective view of the portable support for a potato cutter according to an alternative embodiment.

FIG. 3C illustrates a perspective top view of an alternative embodiment of the portable support 10. This alternative embodiment is similar to the embodiment in FIGS. 3A and 3B except that instead of, or in addition to, the bolt holes 14, the frame 12 includes a linear channel 11 on each side of the frame 12 and a bottom plate 13 extending outward from the frame 12, as shown in FIG. 3C. The channels 11 are configured to accommodate the feet 19 of a potato cutter 20 (see FIG. 4) therein. That is, instead of bolting the potato cutter 20 to the frame 12 via the bolt holes 14, 22, the potato cutter 20 may be attached to the frame 12 by sliding the feet 19 into the channels 11 from a first position above the support 10 to a second position in which two of the feet 19 of the potato cutter 20 abut against the bottom plate 13 of the frame 12. The arrows in FIG. 3C indicate the direction in which the feet 19 of the potato cutter 20 are inserted into the channels 11. In the second position, the potato cutter 20 is supported against lateral movement relative to the frame 12 via the channels 11, and against a downward movement relative to the frame 12 via the bottom plate 13. The potato cutter 20 may be detached from the frame 12 simply by moving the potato cutter 20 upward relative to the frame 12 so that the feet 19 of the potato cutter 20 slide out of the channels 11 of the frame 12. In this alternative embodiment, bolts are not necessary to attach the potato cutter 20 to the frame 12. However, in a further embodiment, in which the frame 12 includes the channels 11 and the bolt holes 14, the potato cutter 20 may be secured to the frame 12 with bolts (e.g., from the back side of the frame 12) when the feet 19 are inside the channels 11.

Figure 4:
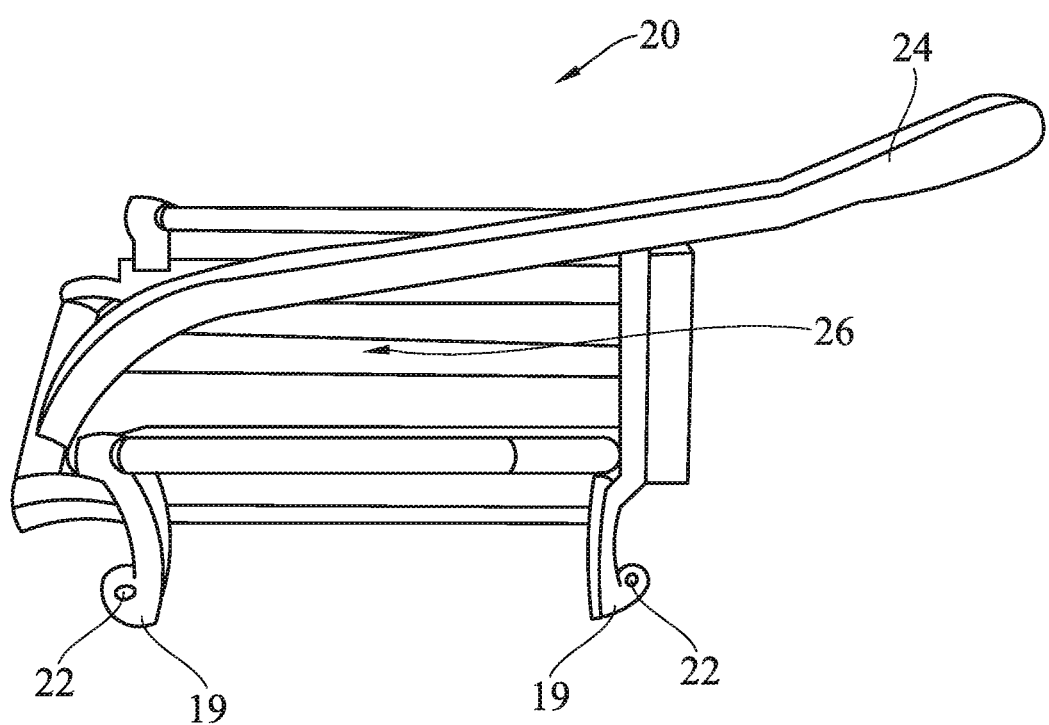
FIG. 4 illustrates an example of a potato cutter usable with the portable support.

FIG. 4 illustrates an example of a potato cutter 20 that is mountable to the portable support 10. The potato cutter 20 includes feet 19 having bolt holes 22 for attaching the potato cutter 20 to the portable support 10 as discussed above. In addition, the potato cutter 20 includes a lever 24 for actuating a cutting system 26. As discussed above, the potato cutter 20 is just one embodiment of a food cutter that may be used with the portable support 10. Other food cutters may be attached to the portable support 10 and used in the same manner discussed herein, so long as the other food cutters have feet that may be bolted to the frame 12 or are slidably attached to the frame 12, as discussed above. Moreover, the potato cutter 20 discussed herein may also be capable of cutting other food, such as fruits and vegetables, in addition to potatoes.

Figure 5:
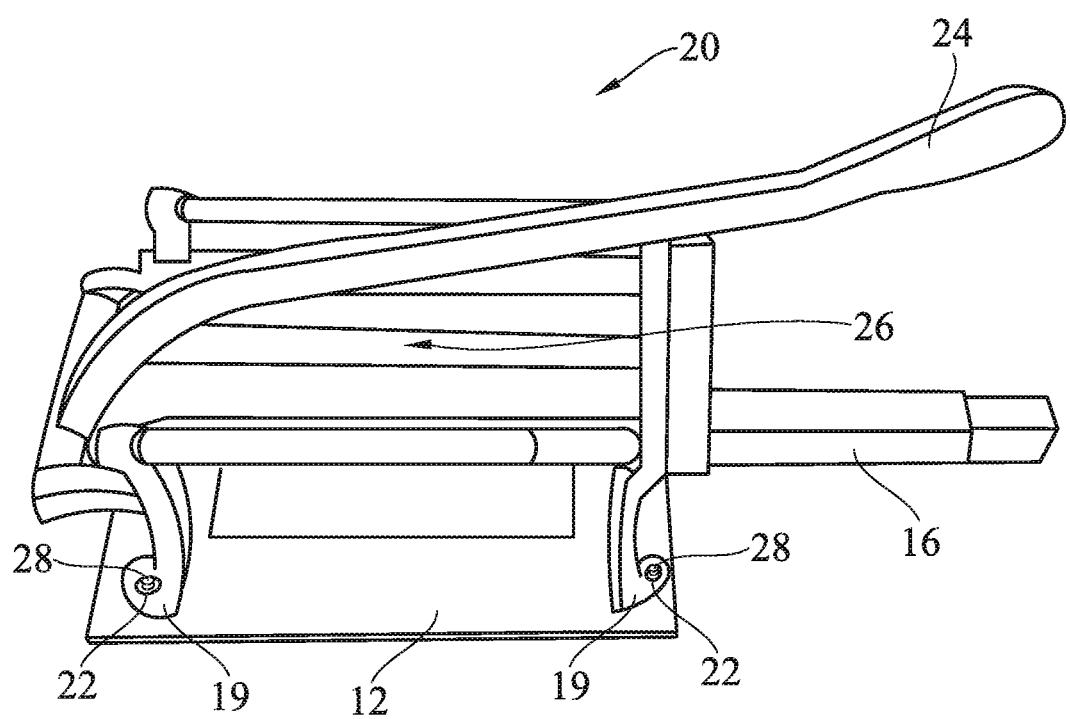
FIG. 5 illustrates an example of the potato cutter mounted to the portable support.

FIG. 5 illustrates an example of the potato cutter 20 mounted to the portable support 10. With the bolt holes 14 of the portable support 10 aligned with corresponding bolt holes 22 of the potato cutter 20, a bolt 28 passes through the pair bolt holes 14, 22 to releasably fix the potato cutter 20 to the frame 12 of the portable support 10 with a nut.

Figure 6A:
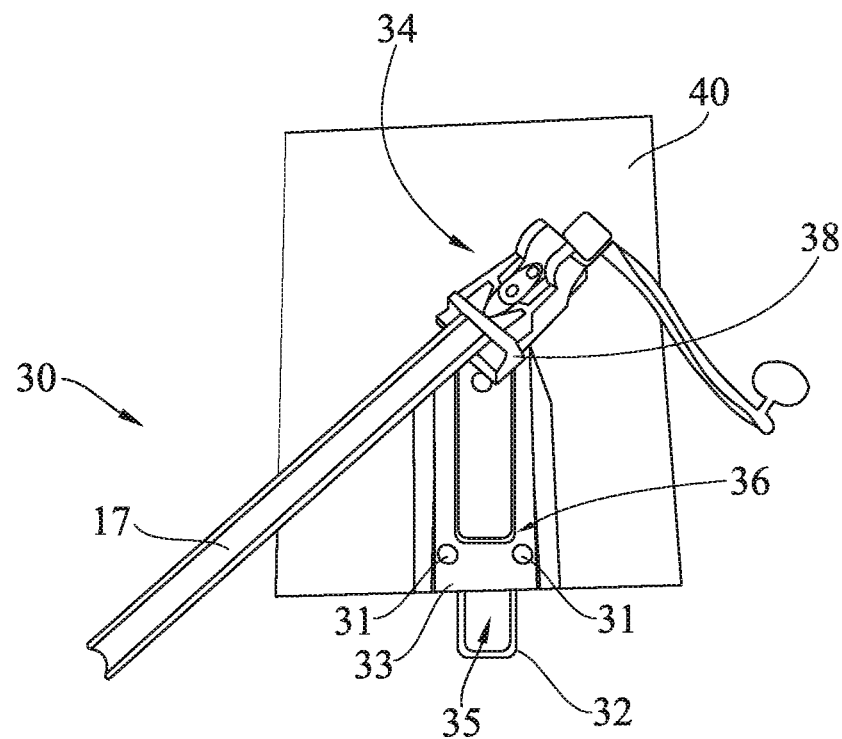
FIGS. 6A and 6B illustrate an example of a can opener usable with the portable support.
Figure 6B:
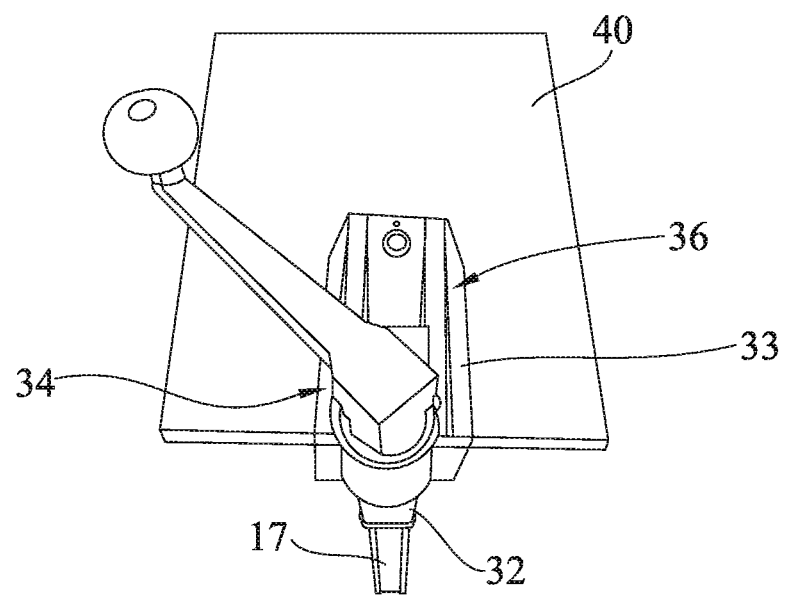

FIGS. 6A and 6B illustrate an example of a can opener 30 that is usable with the portable support 10. FIG. 6A shows that the can opener 30 includes opening mechanism 34 and a table anchor 36. The table anchor 36 includes a mounting portion 33 that is fixed to a table or a counter 40, for example by screws or bolts 31. The mounting portion 33 includes a can opener holder 32 having a cavity 35. The opening mechanism 34 includes a shaft 17 and a cutting mechanism 38 for opening industrial sized (#10) cans. FIG. 6B shows the opening mechanism 34 attached to the table anchor 36 by inserting the shaft 17 into the cavity 35 of can opener holder 32. The size of the cavity 35 may range from 1.27 cm by 1.27 cm (½ inch by ½ inch) to 3.81 cm by 3.81 cm (1 and ½ inches by 1 and ½ inches), and include other values within that range. The size (dimension) of the cavity 35 would be large enough for insertion of the shaft 16.

Figure 7A:
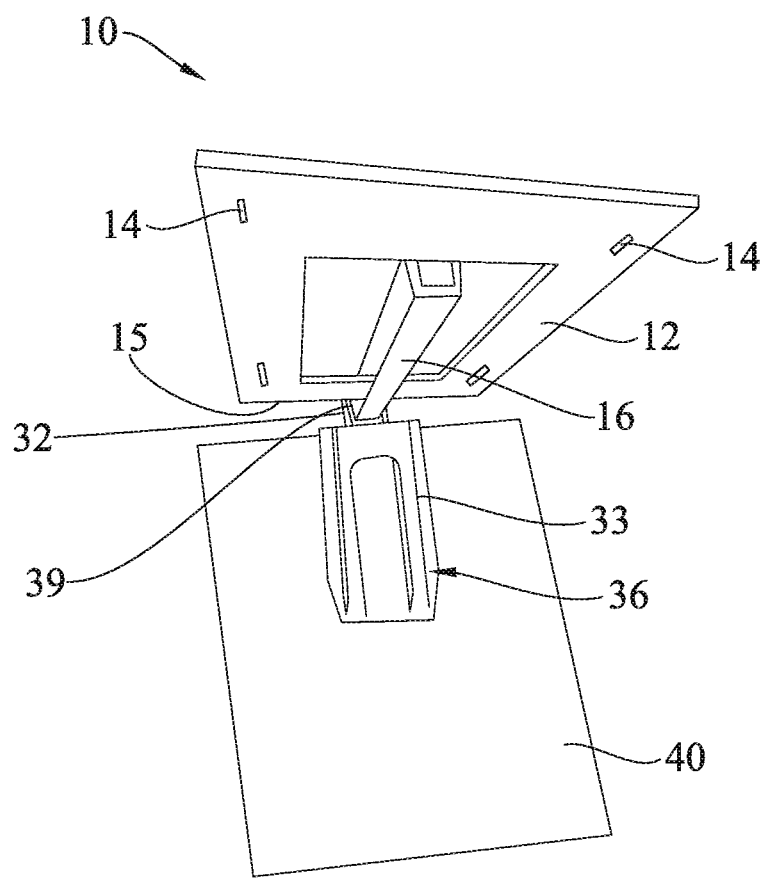
FIGS. 7A and 7B illustrate an example of the portable support being inserted into a holder of the can opener.
Figure 7B:
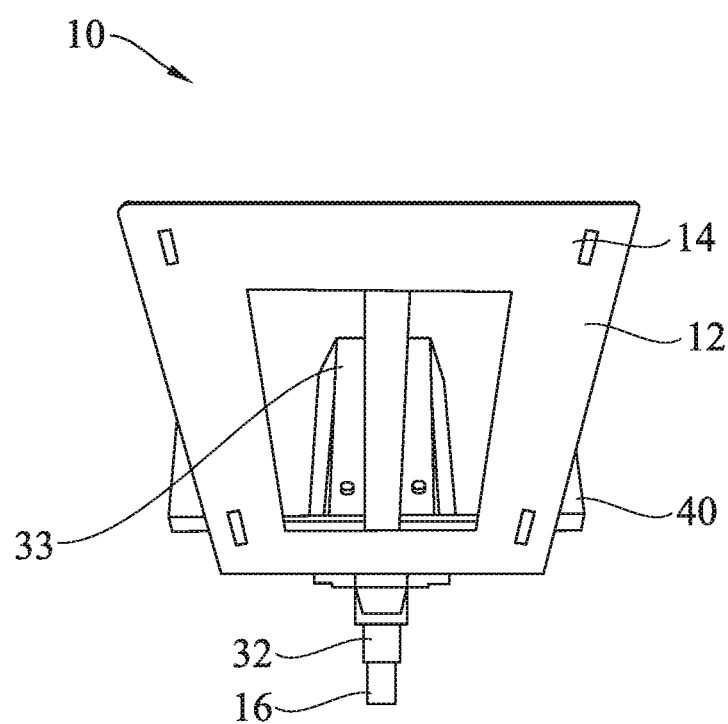

FIG. 7A shows a rear view of the shaft 16 of the portable support 10 inserted into the cavity 35 of can opener holder 32 in the same way as the opening mechanism 34 of the can opener 30. FIG. 7B shows a front view of the shaft 16 of the portable support 10 inserted into the cavity 35 of can opener holder 32. The portable support 10 is secured in the can opener holder 32 by the abutment of a bottom portion 15 of the frame 12 against an outer edge 39 of the can opener holder 32. That is, the tubular shape of the shaft 16 allows the shaft 16 to be inserted into the cavity 35 of can opener holder 32 while the can opener holder 32 is fixed to the table 40.

Figure 8A:
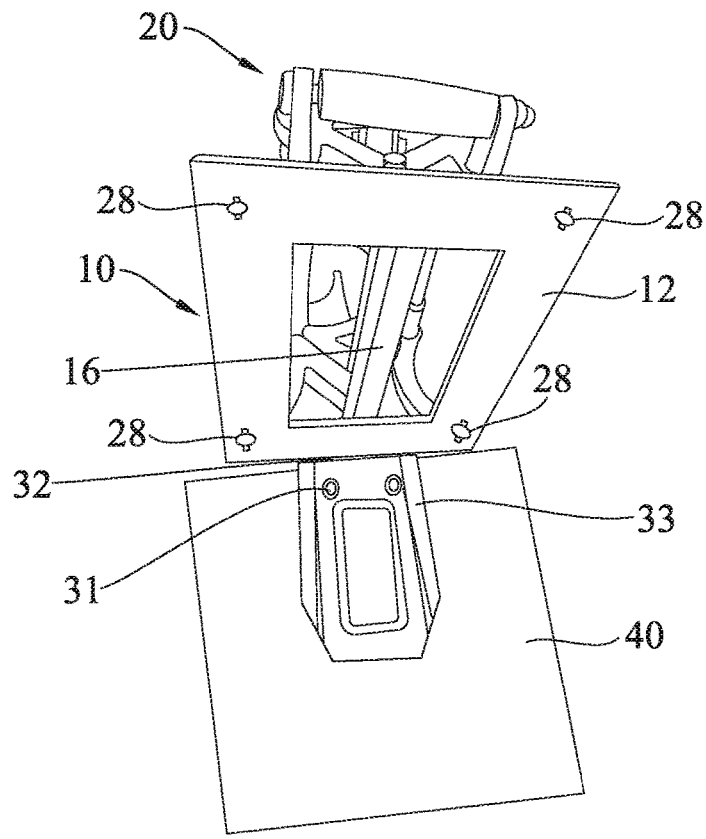
FIGS. 8A and 8B illustrate an example of the portable support and mounted potato cutter being attached to the holder of the can opener.
Figure 8B:
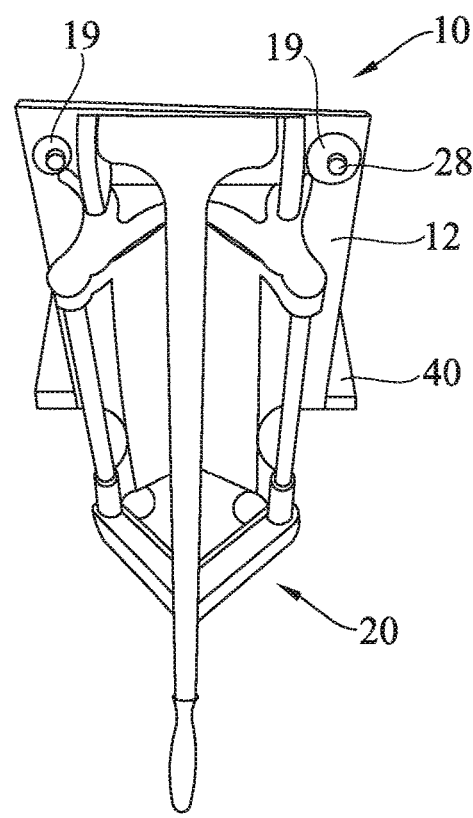

FIGS. 8A and 8B show the portable support 10 and mounted potato cutter 20 being attached to the can opener holder 32 via the engagement of shaft 16 in the cavity 35 of can opener holder 32. FIG. 8A illustrates a view from the table 40 toward the portable support 10, and FIG. 8B illustrates a view from the mounted potato cutter 20. As shown, the engagement of shaft 16 in the cavity 35 of can opener holder 32 orients the frame 12 substantially vertically relative to the table 40. This orientation is beneficial because it allows pieces cut from the potato in the potato cuter 20 fall via gravity into, e.g., a container for collection and further processing. The mounted portable support 10 thus acts as a temporary wall for the potato cutter 20.

Figure 9A:
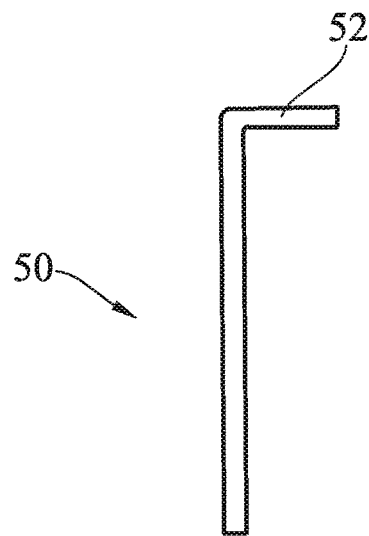
FIGS. 9A to 9C illustrate an example of a spacer for securing the portable support to the can opener holder according to an embodiment.
Figure 9C:
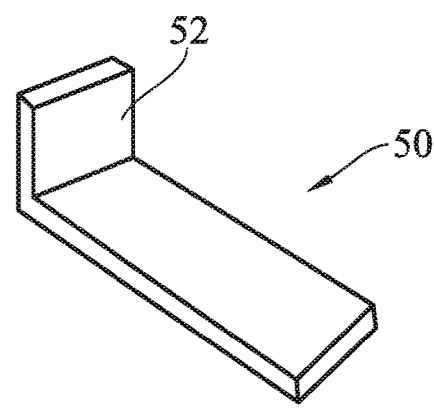
Figure 9B:
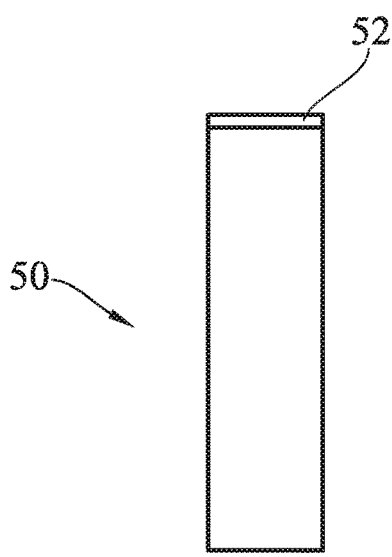

The shaft 16 of the portable support 10 is configured to have a cross-sectional dimension, e.g., 1.27 cm by 1.27 cm (½ inch by ½ inch) that fits into the cavity 35 of most can opener holders 32. In the case that the dimension of the shaft 16 is too small to provide a tight fit within the cavity 35, the portable support 10 may be provided with a spacer 50, as shown in FIGS. 9A to 9C, which is inserted into the cavity 35 with the shaft 16 to eliminate excess space in the cavity 35 between the inner surface of the can opener holder 32 and the shaft 16. The spacer 50 would thus eliminate excess movement or "wiggle" of the shaft 16 within the cavity 35, and provide stability to the mounted portable support 10. FIG. 9A illustrates a side view of the spacer 50. FIG. 9B illustrates a front view of the spacer 50. FIG. 9C illustrates a perspective view of the spacer 50. The spacer 50 may be provided with a handle portion 52 for inserting and retrieving the spacer 50 from the cavity 35 of the can opener holder 32. The spacer may be wedge-shaped such that a thickness of the spacer 50 increases progressively in a direction toward the handle portion 52. For instance, the thickness of a distal portion of the spacer 50 may be 0.32 cm (⅛ of an inch), the thickness of a midsection of the spacer 50 may be 0.635 cm (¼ of an inch), and the thickness of a proximal portion of the spacer 50 near the handle portion 52 may be 0.95 cm (⅜ of an inch) or more. The thickness progression of the spacer 50 may be gradual, or may be stepped. In an embodiment, the spacer 50 may be 5.08 cm (2 inches) long and from 1.27 cm to 3.175 cm (½ to 1 and ¼ inches) wide. The spacer 50 may be L-shaped, V-shaped, or wedge-shaped. The spacer 50 allows the shaft 16 to be fitted into various sizes of can opener holders 32. The spacer 50 may be provided with a chain (not shown) that attaches to the portable support 10 as a convenience so that the spacer 50 is not lost or separated from the portable support 10 when the spacer 50 is not in use. The spacer 50 may be formed of stainless steel, a composite plastic material, cast iron, a rubber material, or any National Sanitary Foundation (NSF) certified material.

Figure 10A:
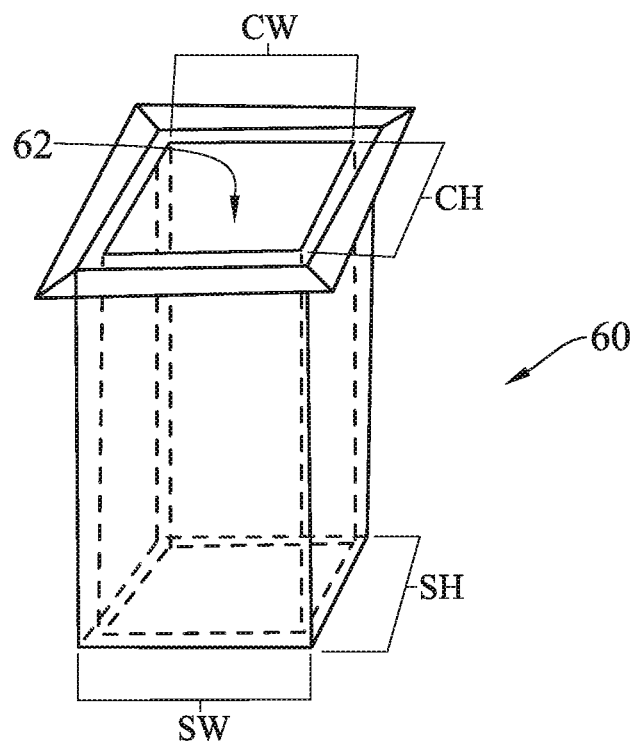
FIGS. 10A and 10B illustrate an example of a detachable sleeve for securing the portable support to the can opener holder according to an embodiment.
Figure 10B:
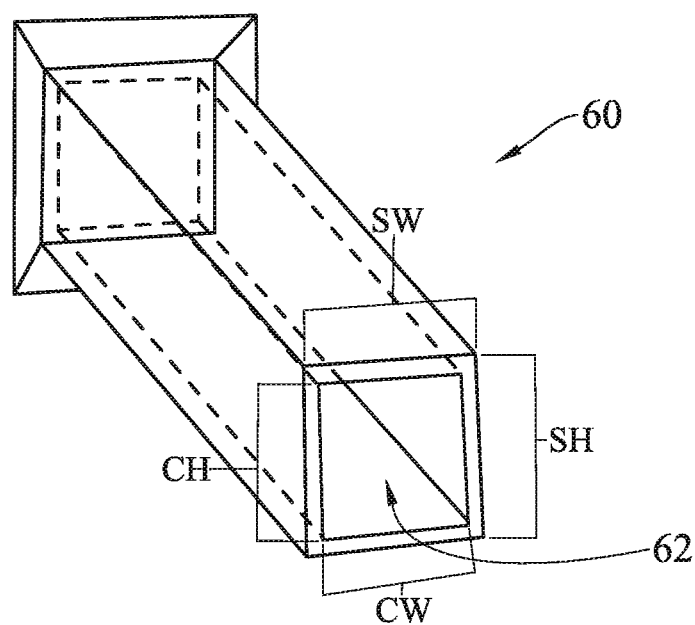

As an alternative to the spacer 50, FIGS. 10A and 10B illustrate an example of a detachable sleeve 60 for the shaft 16 in instances where the dimension of the shaft 16 is too small for a secure engagement in the cavity 35 of the can opener holder 32. In this embodiment, the detachable sleeve 60 is fitted onto the shaft 16 to effectively increase the dimension (e.g., outer perimeter) of the shaft 16 to eliminate excess space in the cavity 35 between the inner surface of the can opener holder 32 and the shaft 16. The detachable sleeve 60 may be 5.08 cm (2 inches) long, and may have a sleeve height "SH" of 1.59 cm (⅝ inch) to 3.81 cm (1 and ½ inches), and sleeve width "SW" of 1.59 cm (⅝ inch) to 3.81 cm (1 and ½ inches). The cavity 62 of the detachable sleeve 60 may have a cavity height "CH" of 1.27 cm (½ inch) to 3.29 cm (1 and ⅜ inches), and cavity width "CW" of 1.27 cm (½ inch) to 3.29 cm (1 and ⅜ inches). The detachable sleeve 60 allows the shaft 16 to be fitted into various sizes of can opener holders 32. The detachable sleeve 60 may be formed of stainless steel, a composite plastic material, cast iron, a rubber material, or any National Sanitary Foundation (NSF) certified material.

A system for cutting potatoes may include: a potato cutter 20 including a plurality of bolt holes 22 for mounting the potato cutter 20; a can opener holder 32 comprising a cavity 35; and a portable support 10 for the potato cutter 20. The portable support 10 may include all of the features and embodiments discussed herein. For instance, the portable support 10 may include a substantially planar frame 12 extending in a plane "x", "y"; a plurality of bolt holes 14 in the frame 12 that align with the bolt holes 22 in the potato cutter 20; and a shaft 16 protruding from the frame 12 and extending substantially parallel with the plane "x", "y" of the frame 12. In the system, the portable support 10 is releasably attached to the potato cutter 20 at the bolt holes 14, 22 via attachment devices, such as bolts, that extend through the bolt holes 14, 22. At least a portion of the shaft 16 is located in the cavity 35 of the can opener holder 32. The shaft 16 is releasable from the cavity 35 of the can opener holder 32 while the potato cutter 20 is attached to the portable support 10. The shaft may be provided with at least one of the detachable sleeve 60 and the spacer 50, as discussed above. The can opener holder 32 is fixed to a table or counter 40, and orients the frame 12 of the portable support 10 substantially vertically relative to the table 40 when the shaft 16 is located in the cavity 35 of the can opener holder 32.

A method for cutting potatoes may include: attaching a potato cutter 20 to a portable support 10 via attachment devices, such as bolts, that extend through a plurality of bolt holes 22 in the potato cutter 20 and a plurality of bolt holes 14 in the portable support 10, the portable support 10 comprising a substantially planar frame 12 extending in a plane "x", "y"; and a shaft 16 protruding from the frame 12 and extending substantially parallel with the plane "x", "y" of the frame 12; and inserting at least a portion of the shaft 16 into the cavity 35 of the can opener holder 32 to orient the frame 12 substantially vertically relative to the table or counter 40. In the method, the shaft 16 may be provided with at least one of a detachable sleeve 60 and a spacer 50 as discussed above. In some instances where the can opener holder 32 is not already fixed to the table or counter 40, the method may also include fixing the can opener holder 32 to the table or counter 40. The method may further comprise withdrawing the shaft 16 from the cavity 35 of the can opener holder 32 while the potato cutter 20 is attached to the portable support 10.

The portable support, potato cutting system and methods discussed herein save valuable counter space (or table or wall space), makes the potato cutter easy to clean, and quickly and easily anchors and removes the potato cutter to from a counter (or table or wall) or other use position. The portable support 10 imparts an increased level of sanitation to the potato cutter 20 because the frame 12, with the attached potato cutter 20, can be withdrawn from the can opener holder 32 of the can opener 30 as a unit, and the unit can easily be washed in a sink or commercial dishwashing machine. Because the portable support 10 is portable and acts as a wall for the potato cutter 20, the portable support 10 is particularly useful in smaller kitchens or food trucks where counter space (or table or wall space) is at a premium. Moreover, the shaft 16 of the portable support 10 allows the potato cutter 20 to be easily mounted and dismounted from the can opener holder 32, which saves preparation time.

Although several preferred embodiments have been illustrated in the accompanying drawings and describe in the foregoing specification, it will be understood by those of skill in the art that additional embodiments, modifications and alterations may be constructed from the principles disclosed herein.

What is claimed is:

1. A portable support for a food cutter, comprising:
a substantially planar frame extending in a plane;
an attachment device on the frame for attaching the frame to the food cutter;
a shaft protruding from the frame and extending substantially parallel with the plane of the frame,
wherein the shaft is configured to be inserted into a cavity of a can opener, and the shaft is provided with one of a detachable sleeve and a spacer to increase the dimension of the shaft.

2. The portable support according to claim 1, wherein the attachment device comprises a channel on opposite sides of the frame.

3. The portable support according to claim 1, wherein the attachment device comprises a plurality of holes in the frame.

4. The portable support according to claim 3, wherein the frame is substantially rectangular, and each of the plurality of holes is respectively located in a vicinity of a corner of the frame.

5. The portable support according to claim 1, wherein the shaft extends from one end of the frame towards an opposite end of the frame.

6. A system for cutting food, comprising:
a food cutter including feet for mounting the food cutter;
a can opener holder comprising a cavity; and
a portable support for the food cutter, comprising:
a substantially planar frame extending in a plane;
an attachment device on the frame for connecting the feet of the food cutter to the frame; and
a shaft protruding from the frame and extending substantially parallel with the plane of the frame, wherein
the portable support is releasably attached to the food cutter when the feet are connected to the attachment device, and
at least a portion of the shaft is located in the cavity of the can opener holder.

7. The system according to claim 6, wherein
the shaft is releasable from the cavity of the can opener holder while the food cutter is attached to the portable support.

8. The system according to claim 6, wherein the shaft is provided with one of a detachable sleeve and a spacer to increase the dimension of the shaft.

9. The system according to claim 6, wherein the can opener holder is fixed to a table or counter, and orients the frame substantially vertically relative to the table or counter when the at least a portion of the shaft is located in the cavity of the can opener holder.

10. The system according to claim 9, wherein the attachment device comprises a channel on opposite sides of the frame, and the feet are configured to be inserted into the channels for connecting the feet to the frame.

11. The system according to claim 6, wherein the attachment device comprises a plurality of holes in the frame, and each of the feet comprises a hole for aligning with one of the plurality of holes in the frame for connecting the feet to the frame with a bolt through an aligned pair of holes.

12. The system according to claim 6, wherein the frame is substantially rectangular, the attachment device comprises a plurality of holes, and each of the plurality of holes is respectively located in a vicinity of a corner of the frame.

13. The system according to claim 6, wherein the shaft extends from one end of the frame towards an opposite end of the frame.

14. A method comprising:
attaching a food cutter to a portable support via an attachment device, the portable support comprising a substantially planar frame extending in a plane; and a shaft protruding from the frame and extending substantially parallel with the plane of the frame; and
inserting at least a portion of the shaft into a cavity of a can opener holder that is fixed to a surface to orient the frame substantially vertically relative to the surface.

15. The method according to claim 14, further comprising providing the shaft with one of a detachable sleeve and a spacer to increase the dimension of the shaft.

16. The method according to claim 14, further comprising:
withdrawing the shaft from the cavity of the can opener holder while the food cutter is attached to the portable support.

17. The method according to claim 14, wherein the shaft extends from one end of the frame towards an opposite end of the frame.

* * * * *